US012602109B2

(12) United States Patent
Kuo et al.

(10) Patent No.: US 12,602,109 B2
(45) Date of Patent: Apr. 14, 2026

(54) METHOD FOR AUTOMOTIVE DEVICE TO PROJECT IMAGE ONTO WINDSHIELD FOR VIEWING BY PRIMARY VIEWER

(71) Applicants:InnoLux Corporation, Miao-Li County (TW); CARUX TECHNOLOGY PTE. LTD., Aperia (SG)

(72) Inventors: Hsuan-Ting Kuo, Miao-Li County (TW); Chia-Hsien Hsieh, Miao-Li County (TW); Hong-Sheng Hsieh, Miao-Li County (TW); Chi-Lun Feng, Tainan (TW)

(73) Assignees: Innolux Corporation, Miaoli County (TW); CARUX TECHNOLOGY PTE. LTD., Singapore (SG)

(*) Notice: Subject to any disclaimer, the term of this patent is extended or adjusted under 35 U.S.C. 154(b) by 0 days.

(21) Appl. No.: 18/964,331

(22) Filed: Nov. 29, 2024

(65) Prior Publication Data

US 2025/0216938 A1    Jul. 3, 2025

Related U.S. Application Data

(60) Provisional application No. 63/614,943, filed on Dec. 27, 2023.

(30) Foreign Application Priority Data

Jun. 26, 2024    (CN) .......................... 202410837768.8

(51) Int. Cl.
G06F 3/01        (2006.01)
B60K 35/235        (2024.01)
(Continued)

(52) U.S. Cl.
CPC ............ G06F 3/013 (2013.01); B60K 35/235 (2024.01); G06T 7/70 (2017.01); G09G 3/001 (2013.01);
(Continued)

(58) Field of Classification Search
CPC ........... G06F 3/013; G06T 7/70; G09G 3/001; G09G 2380/10; B60K 35/235
See application file for complete search history.

(56) References Cited

U.S. PATENT DOCUMENTS

| 8,817,090 B2 | 8/2014 | Szczerba | |
| 2007/0070092 A1* | 3/2007 | Oh .......................... | G09G 3/36 345/690 |

(Continued)

FOREIGN PATENT DOCUMENTS

| CN | 101866050 A | 10/2010 |
| CN | 101913357 A | 12/2010 |

(Continued)

OTHER PUBLICATIONS

Chinese language office action dated Apr. 30, 2025, issued in application No. TW 113123679.

*Primary Examiner* — Matthew A Eason
*Assistant Examiner* — Scott D Au
(74) *Attorney, Agent, or Firm* — JCIPRNET

(57)        ABSTRACT

A method for an automotive device to project an image onto a windshield for viewing by a primary viewer is provided. The method includes the following steps. The primary viewer state is determined. The corresponding content correction signal and the corresponding gamma correction signal are output according to the primary viewer state. A corresponding display signal is generated according to the corresponding content correction signal and the corresponding gamma correction signal. The image is displayed according to the display signal. The image is projected onto the windshield.

16 Claims, 4 Drawing Sheets

(51) Int. Cl.
  G06T 7/70          (2017.01)
  G09G 3/00          (2006.01)
(52) U.S. Cl.
  CPC .................. *B60K 2360/741* (2024.01); *G06T 2207/30201* (2013.01); *G06T 2207/30268* (2013.01); *G09G 2320/0673* (2013.01); *G09G 2354/00* (2013.01); *G09G 2380/10* (2013.01)

(56)                References Cited

U.S. PATENT DOCUMENTS

| 2020/0012342 A1* | 1/2020 | Hassani | G02B 27/28 |
| 2022/0128859 A1* | 4/2022 | Takahata | G02B 27/0101 |
| 2023/0088007 A1* | 3/2023 | Hartwig | B60K 35/60 |
| | | | 359/632 |
| 2023/0259203 A1* | 8/2023 | Mulliken | G06F 3/013 |
| | | | 345/156 |
| 2023/0401760 A1* | 12/2023 | Byoun | G02B 27/01 |

FOREIGN PATENT DOCUMENTS

| CN | 116343698 A | 6/2023 | |
| KR | 20200141428 A | * 12/2020 | G06F 3/013 |

* cited by examiner

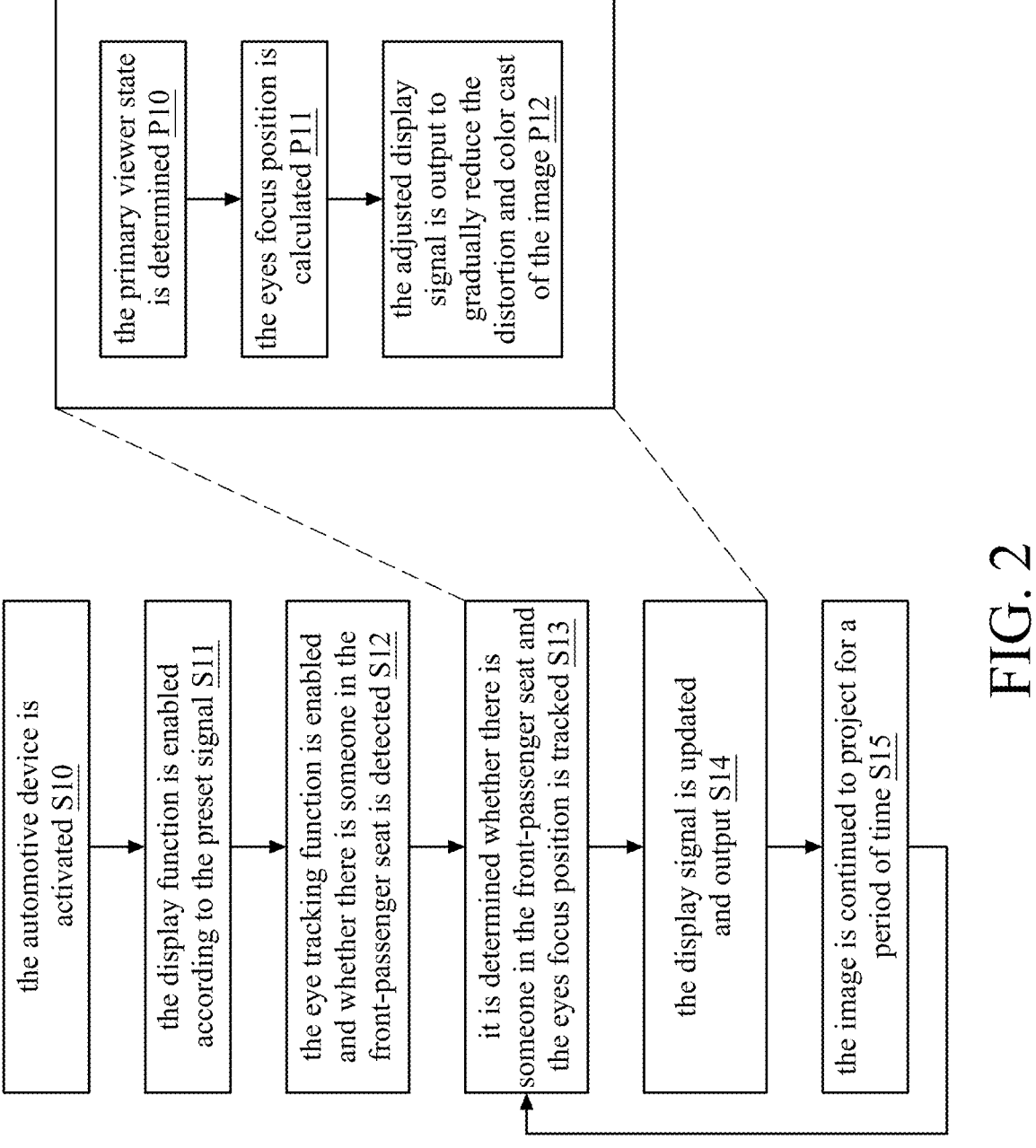

the primary viewer state is determined P10 the eyes focus position is calculated P11 the adjusted display signal is output to gradually reduce the distortion and color cast of the image P12 the automotive device is activated S10 the display function is enabled according to the preset signal S11 the eye tracking function is enabled and whether there is someone in the front-passenger seat is detected S12 it is determined whether there is someone in the front-passenger seat and the eyes focus position is tracked S13 the display signal is updated and output S14 the image is continued to project for a period of time S15

FIG. 2

METHOD FOR AUTOMOTIVE DEVICE TO PROJECT IMAGE ONTO WINDSHIELD FOR VIEWING BY PRIMARY VIEWER

CROSS REFERENCE TO RELATED APPLICATIONS

This Application claims the benefit of U.S. Provisional Application No. 63/614,943, filed 27 Dec. 2023, and priority of China Patent Application No. 202410837768.8, filed on 26 Jun. 2024, the entirety of which are incorporated by reference herein.

BACKGROUND OF THE INVENTION

Field of the Invention

The present disclosure relates to automotive devices, and, in particular, to a method for an automotive device to project an image onto a windshield for viewing by a primary viewer.

Description of the Related Art

As users' requirements become higher and higher, the number of automotive devices installed on vehicles is also gradually increasing. For example, automotive devices include image projection devices such as panoramic heads-up displays (PHUD), which can project an image onto the windshield so that the driver or front-seat passenger can view information such as navigation maps, vehicle status, surrounding images, and driving recorders on the windshield.

However, windshields usually have a curvature, which causes image distortion or color casts in images projected onto the windshield. In addition, different users may have different viewing angles, which exacerbates the problem of poor viewing quality. In other words, although existing automotive devices have largely met their intended purposes, they do not meet requirements in all respects. Therefore, there is still a need to develop new image projection devices for automotive devices.

BRIEF SUMMARY OF THE INVENTION

In some embodiments, a method for an automotive device to project an image onto a windshield for viewing by a primary viewer is provided. The method includes the following steps. The primary viewer state is determined. The corresponding content correction signal and the corresponding gamma correction signal according to the primary viewer state are output. The corresponding display signal according to the corresponding content correction signal and the corresponding gamma correction signal is generated. The image is displayed according to the display signal. The image is projected onto the windshield.

The method for the automotive device to project an image onto the windshield for viewing by the primary viewer can be applied in various image projection devices in vehicles. In order to make the features and advantages of the present disclosure more comprehensible, various embodiments are specially cited hereinafter, together with the accompanying drawings, to be described in detail as follows.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2 is a flowchart showing the method for the automotive device to project an image onto the windshield for viewing by the primary viewer according to some embodiments of the present disclosure.

DETAILED DESCRIPTION OF THE INVENTION

Figure 1:
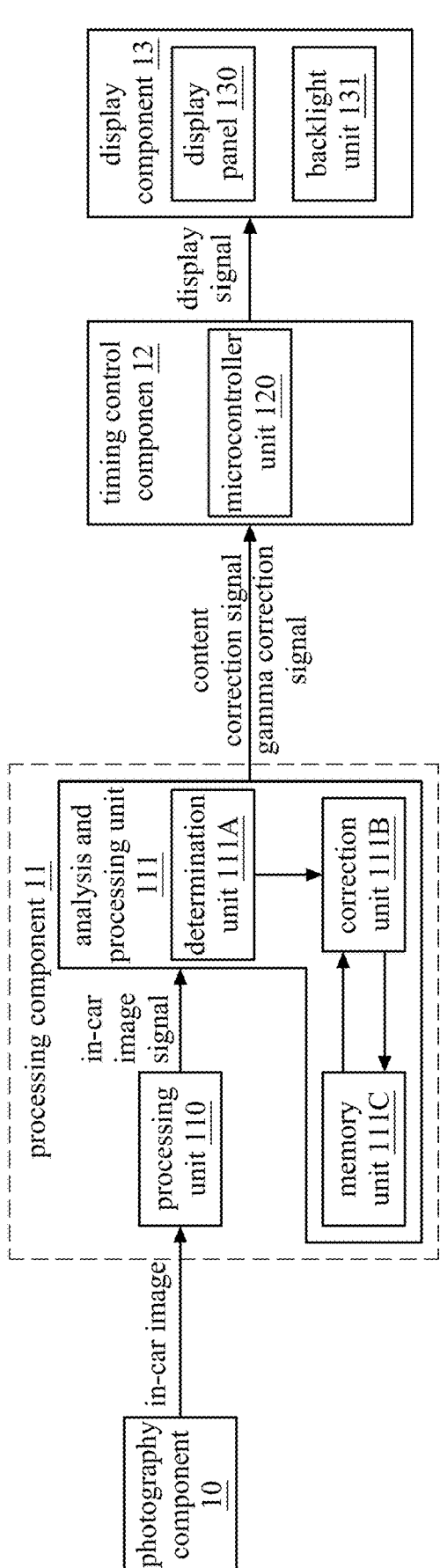
FIG. 1 is a block diagram showing the automotive device according to some embodiments of the present disclosure.

In order to make the above objects, features, and benefits of some embodiments of the present disclosure more obvious and understandable, detailed descriptions are given hereinafter with reference to the drawings.

It should be understood that the terms "include" and "comprise" used in the present disclosure are used to indicate the existence of specific technical features, numerical values, method steps, operation processes, elements, and/or components, but do not exclude that more technical features, numerical values, method steps, operation processes, elements, components, or any combination thereof may be added.

The terms such as "first", "second", "third", "fourth", and the like are used to modify elements and are not used to indicate the priority or precedence relationship therebetween but are used to clearly distinguish elements with the same name.

It should be noted that, in the following embodiments, features in several different embodiments may be replaced, recombined, and bonded to complete other embodiments without departing from the spirit of the present disclosure. The features of the various embodiments can be used in any combination as long as they do not violate the spirit of the present disclosure or conflict with each other.

In the present disclosure, the electronic device may include a display device, a back light device, an antenna device, a sensing device, an automotive device, or a titling device, but the present disclosure is not limited thereto. The electronic device may be a foldable or flexible electronic device. The display device may be a non-self-luminous display device or a self-luminous display device. The antenna device may be a liquid-crystal antenna device or a non-liquid-crystal antenna device. The sensing device may be a sensing device for sensing capacitance, light, heat, or ultrasonic waves, but the present disclosure is not limited thereto. The electronic elements may include passive elements and active elements, such as capacitors, resistors, inductors, diodes, transistors, and the like. The diodes may include light-emitting diodes or photodiodes. The light-emitting diodes may include, for example, organic light-emitting diodes (OLEDs), mini light-emitting diodes (mini LEDs), micro light-emitting diodes (micro LEDs), or quantum dot light-emitting diodes (quantum dot LED), but the present disclosure is not limited thereto. The titling device may be, for example, a display titling device or an antenna titling device, but the present disclosure is not limited thereto. It should be noted that, the electronic device can be any arrangement and combination of the foregoing, but the present disclosure is not limited thereto. The content of the present disclosure will be described hereinafter with an electronic device as a display device or a titling device, but the present disclosure is not limited thereto.

In addition, the shape of the electronic device may be a rectangle, a circle, a polygon, a shape with curved edges, or other suitable shapes. The electronic device may have peripheral systems such as a processing system, a driving system, a control system, a light source system, and a shelf system to support the electronic device.

In some embodiments, additional features may be added to the electronic device of the present disclosure. In some embodiments, some features of the electronic device disclosed herein may be replaced or omitted. In some embodiments, additional operation steps may be provided before, within, and after the manufacturing method of the electronic device. In some embodiments, some of the described operation steps may be replaced or omitted, and the order of some of the described operation steps may be interchangeable. Furthermore, it should be understood that some of the described operation steps may be replaced or deleted for other embodiments of the method. Moreover, in the present disclosure, the number and size of each element in the drawings are only for illustration, and are not used to limit the scope of the present disclosure.

With the popularization of automotive devices, users' reliance on obtaining information from automotive devices has gradually increased. For example, viewing information such as navigation maps, vehicle status, surrounding images, and driving recorders from images projected by image projection devices such as panoramic heads-up displays can help improve driving safety and convey vehicle information. However, when the user observes the image content on the panoramic heads-up display from different viewpoints or angles, the curved windshield of the vehicle (such as a hyperbolic curve) will cause image distortion or color shift, which is not conducive to the user's viewing. To this end, the present disclosure provides a method for an automotive device to project an image onto a windshield for viewing by a primary viewer, which can determine the primary viewer state, thereby providing an image suitable for the primary viewer's status for viewing.

FIG. 1 is a block diagram showing the automotive device according to some embodiments of the present disclosure. As shown in FIG. 1, the automotive device 1 includes the photography component 10, the processing component 11, the timing control component 12, and the display component 13. The photography component 10 is used to capture an in-car image and provide the in-car image to the processing component 11 for image processing and determination. The in-car image may include a facial image of a driver or a facial image of a front-seat passenger. In some embodiments, the photography component 10 may be installed at any appropriate position of the vehicle in an embedded or plug-in manner, and the photography component 10 may capture the facial image of the driver or the facial image of the front-seat passenger. For example, the photography component 10 may be disposed on the vehicle's dashboard, center console, in-car rear mirror, A-pillar, B-pillar, C-pillar, left door panel, right door panel, driver's armrest, front-seat passenger's armrest, or other suitable locations, but the present disclosure is not limited thereto. In some embodiments, the photography component 10 may also include multiple lenses disposed at different positions to provide multiple in-car images from different angles.

In some embodiments, the photography component 10 may include an optical lens and a photosensitive element coupled to the optical lens. For example, the optical lens may be or may include a telecentric lens, which allows the captured image to be unaffected by lens parallax within a certain physical distance while achieving a wide depth of field effect. Alternatively, the optical lens may also be a general lens, a wide-angle lens, a telephoto lens, a combination thereof, or other suitable lenses, but the present disclosure is not limited thereto. For example, the photosensitive element may be a charge-coupled device, a complementary metal-oxide-semiconductor (CMOS), other suitable photosensitive elements, or a combination thereof, but the present disclosure is not limited thereto.

As shown in FIG. 1, the processing component 11 is electrically connected to the photography component 10, and receives and analyzes the in-car image from the photography component 10. After analyzing the in-car image, the processing component 11 determines the primary viewer state and outputs a correction signal to the timing control component 12. Herein, the term "primary viewer state" refers to the current primary projection object of the automotive device 1. For example, the primary viewer state may include a driving viewing state or a front-seat passenger viewing state. When the primary viewer state is the driver viewing state, the processing component 11 provides a correction signal for the driver's seat so that the image generated by the display component 13 may be clearly displayed to the driver's eyes. When the primary viewer state is the front-seat passenger viewing state, the processing component 11 provides a correction signal for the front-passenger seat so that the image generated by the display component 13 may be clearly displayed to the front-seat passenger's eyes. However, the present disclosure is not limited thereto. In some embodiments, the primary viewer state may further include a back seat viewing state. When the primary viewer state is the back seat viewing state, the processing component 11 provides a correction signal for the back seat, so that the image generated by the display component 13 may be clearly displayed to the passengers' eyes in the back seat.

In some embodiments, the processing component 11 may include the image processing unit 110 and the analysis and processing unit 111. The image processing unit 110 is electrically connected to the photography component 10 and converts the in-car image from the photography component 10 into an in-car image signal. Among them, the in-car image signal may be provided to the analysis and processing unit 111 for analysis to determine the primary viewer state.

In some embodiments, the image processing unit 110 may include processing and storage components such as a processor, computer-readable media, and memory to execute computer programs to implement the functions described above. Examples of the processor may include a central processing unit (CPU), a multi-core CPU, a graphics processing unit (GPU), etc., but the present disclosure is not limited thereto. Examples of computer-readable media may include compact disc read-only memory (CD-ROM), hard drive, erasable programmable read-only memory (EPROM), electrically erasable programmable read-only memory (EE-PROM), etc., but the present disclosure is not limited thereto. Examples of memory may include dynamic random access memory (DRAM), static random access memory (SRAM), flash memory, etc., but the present disclosure is not limited thereto. It should be noted that the term "computer program" used herein refers to an application program stored in a computer-readable medium that may be read into the memory for processing by the processor. In some embodiments, applications may be written in any combination of one or more programming languages. Programming languages include object-oriented programming languages, such as Java, Smalltalk, C++, python, or similar languages, as well as traditional programming languages, such as the C programming language or similar programming languages.

The analysis and processing unit 111 is electrically connected to the image processing unit 110 and analyzes the in-car image signal from the image processing unit 110 to determine the primary viewer state. In some embodiments, the analysis and processing unit 111 may include processing and storage components such as a processor, computer-readable media, and memory to execute computer programs to implement the functions described above. Examples of the processing and storage components of the processor, computer-readable media, and memory may be referred to the above, and the descriptions thereof are omitted here.

In some embodiments, the analysis and processing unit 111 may include the determination unit (neural network processor unit, NPU) 111A, the correction unit (dewarping processor unit) 111B, and the memory unit 111C.

The determination unit 111A may be used to perform an image recognition function on the in-car image to confirm whether there is someone in the front-passenger seat. For example, when the determination unit 111A determines that there is no one in the front-passenger seat according to the in-car image, the determination unit 111A determines that the primary viewer state is the driver viewing state. In addition, when the determination unit 111A determines that there is a front-seat passenger in the front-passenger seat according to the in-car image, the determination unit 111A may further perform an eye tracking function to determine the driver's line of sight or the front-seat passenger's line of sight from the facial image of the in-car image. When the determination unit 111A determines that the driver's line of sight is focused on the image of the automotive device 1 according to the facial image of the in-car image, regardless of whether the front-seat passenger's line of sight is focused on the image of the automotive device 1, the determination unit 111A determines that the primary viewer state is the driver viewing state. In addition, when the determination unit 111A determines that the driver's line of sight is not focused on the image of the automotive device 1 according to the facial image of the in-car image, but the front-seat passenger's line of sight is focused on the image of the automotive device 1, the determination unit 111A determines that the primary viewer state is the front-seat passenger viewing state. In other words, regardless of whether the front-seat passenger watches the image or not, when the driver watches the image, the determination unit 111A determines that the primary viewer state is the driver viewing state. That is, driving has a higher viewing priority. Table 1 below shows the possible situations.

TABLE 1

|  | the front-seat passenger is watching the image | the front-seat passenger is not watching the image |
| --- | --- | --- |
| the driver is watching the image | the driver viewing state | the driver viewing state |
| the driver is not watching the image | the front-seat passenger viewing state | the driver viewing state |

In some embodiments, the viewing angle difference caused by the user's body shape difference (for example, height, head shape, etc.) may also affect the viewing effect, and the position where the user's eyes focus may also affect the viewing effect. Therefore, in these embodiments, the determination unit 111A may continuously perform the eye tracking function to obtain a driver average eye position of the driver within a specific period. For example, the determination unit 111A may continue to execute the eye tracking function within a first period to determine that the primary viewer state is the driver viewing state, and the driver viewing state includes the driver average eye position. The driver average eye position is the average driver eye focus position within the first period. In this case, the correction unit 111B may provide a correction signal more suitable for driver according to the driver average eye position of the driver viewing state (which is further described below), so that the image may present a gradient effect, further improving the user experience. In some embodiments, the first period may be between 0.5 seconds and 3 seconds, but the present disclosure is not limited thereto. For example, the first period may be 0.5 seconds, 1 second, 1.25 seconds, 1.5 seconds, 1.75 seconds, 2 seconds, 2.25 seconds, 2.5 seconds, 2.75 seconds, 3 seconds, or any value or range between the above values.

Similarly, in some embodiments, the determination unit 111A may continuously perform the eye tracking function to obtain a front-seat passenger average eye position of the front-seat passenger within a specific period. For example, the determination unit 111A may continue to execute the eye tracking function within a second period to determine that the primary viewer state is the front-seat passenger viewing state, and the front-seat passenger viewing state includes the front-seat passenger average eye position. The front-seat passenger average eye position is the average front-seat passenger eye focus position within the second period. In this case, the correction unit 111B may provide a correction signal more suitable for front-seat passenger according to the front-seat passenger average eye position of the front-seat passenger viewing state, so that the image may present a gradient effect, further improving the user experience. In some embodiments, the second period may be between 0.5 seconds and 3 seconds, but the present disclosure is not limited thereto. For example, the second period may be 0.5 seconds, 1 second, 1.25 seconds, 1.5 seconds, 1.75 seconds, 2 seconds, 2.25 seconds, 2.5 seconds, 2.75 seconds, 3 seconds, or any value or range between the above values.

The correction unit 111B is electrically connected to the analysis and processing unit 111 and provides a corresponding content correction signal for correcting image distortion and a corresponding gamma correction signal for correcting image color deviation according to one of the driver viewing state and the front-seat passenger viewing state. In some embodiments, the correction unit 111B may provide the corresponding content correction signal and the corresponding gamma correction signal according to the correction signal or the correction data table that are pre-stored in the memory unit 111C, but the present disclosure is not limited thereto. In other embodiments, the correction unit 111B may also perform interpolation to provide the corresponding content correction signal and the corresponding gamma correction signal.

The memory unit 111C is electrically connected to the correction unit 111B and stores a preset correction signal or correction data table. The preset correction signal or correction data table may include corresponding content correction signals and corresponding gamma correction signals corresponding to different positions or different viewer modes (i.e., the driver viewing state and the front-seat passenger viewing state). In some embodiments, the memory unit 111C may be electrically connected to the determination unit 111A for access by the determination unit 111A to perform some of the functions mentioned above. In other words, in these embodiments, the determination unit 111A and the correction unit 111B may share one memory unit 111C.

It should be noted that although FIG. 1 shows that the memory storing the preset correction signal or correction data table exists alone in the form of the memory unit 111C, the present disclosure is not limited thereto. In some embodiments, the memory may be part of the determination unit 111A or the correction unit 111B and integrated into either or both of them. In this case, the analysis and processing unit 111 includes the determination unit 111A and the correction unit 111B but does not include the memory unit 111C. Alternatively, there may be a plurality of memories, and they may be electrically connected to the judging unit 111A and the correction unit 111B. In this case, the analysis and processing unit 111 includes the determination unit 111A, the correction unit 111B, and a plurality of memory units 111C, and the determination unit 111A and the correction unit 111B are connected to different ones of the plurality of memory units 111C.

As shown in FIG. 1, the timing control component 12 is electrically connected to the processing component 11 to generate a corresponding display signal according to the corresponding content correction signal and the corresponding gamma correction signal generated by the processing component 11. In some embodiments, the timing control component 12 may include a microcontroller unit (MCU) 120. For example, the micro control unit may include a central processing unit (CPU), memory (RAM), input/output interface (I/O), and other suitable components to perform local dimming control, LED driver control, or other suitable control function. In some embodiments, the timing control component 12 may further include a signal conversion unit to perform switching between different signals. In some embodiments, the display signal may include a display panel signal and a backlight signal, but the present disclosure is not limited thereto. In some embodiments where the display panel is a self-luminous display panel, the display signal may include a display panel signal but not a backlight signal.

As shown in FIG. 1, the display component 13 is electrically connected to the timing control component 12 to display images according to the display signal generated by the timing control component 12. Specifically, the displayed image is projected onto the windshield for viewing by the user (for example, the driver or front-seat passenger). In some embodiments, the display assembly 13 may include the display panel 130 and the backlight unit 131. In this case, the display panel 130 may be a non-self-luminous display panel such as a liquid crystal display device. However, the present disclosure is not limited thereto. In some embodiments, the display assembly 13 may include the display panel 130 but not the backlight unit 131. In this case, the display panel 130 may be a self-luminous display panel. Since the image generated by the display component 13 has been adjusted according to the corresponding content correction signal and the corresponding gamma correction signal corresponding to the driving viewing mode, the image projected onto the windshield may have smaller distortion and color shift or even have no distortion or color cast.

As mentioned above, the present disclosure provides the automotive device 1 that determines the primary viewer state through the photography component 10 and the processing component 11, thereby providing appropriate correction signals to the timing control component 12. In this way, the problem of image distortion or color cast of images generated by the display component 13 may be effectively reduced.

It should be noted that although some embodiments of using image recognition to determine whether there is someone in the front-passenger seat are mentioned above, the present disclosure is not limited thereto. In some embodiments, the automotive device 1 may further include a front-seat passenger sensing device for providing front-seat passenger sensing information, and the processing component 11 may determine the primary viewer state according to the front-seat passenger sensing information. For example, the front-seat passenger sensing device may include a seat pressure sensing unit, a seat belt buckle sensing unit, other suitable sensing units, or a combination thereof. When the seat pressure sensing unit senses that the pressure of the front-passenger seat is less than a preset pressure, or the seat belt buckle sensing unit senses that the seat belt buckle of the front-passenger seat is not buckled, the processing component 11 may determine that there is no front-seat passenger in the driver's seat, thus determining the primary viewer state to be the driving viewing state. In some embodiments, the processing component 11 may determine the primary viewer state according to both the in-car image and the front-seat passenger sensing information to improve the accuracy of the determination.

Figure 3:
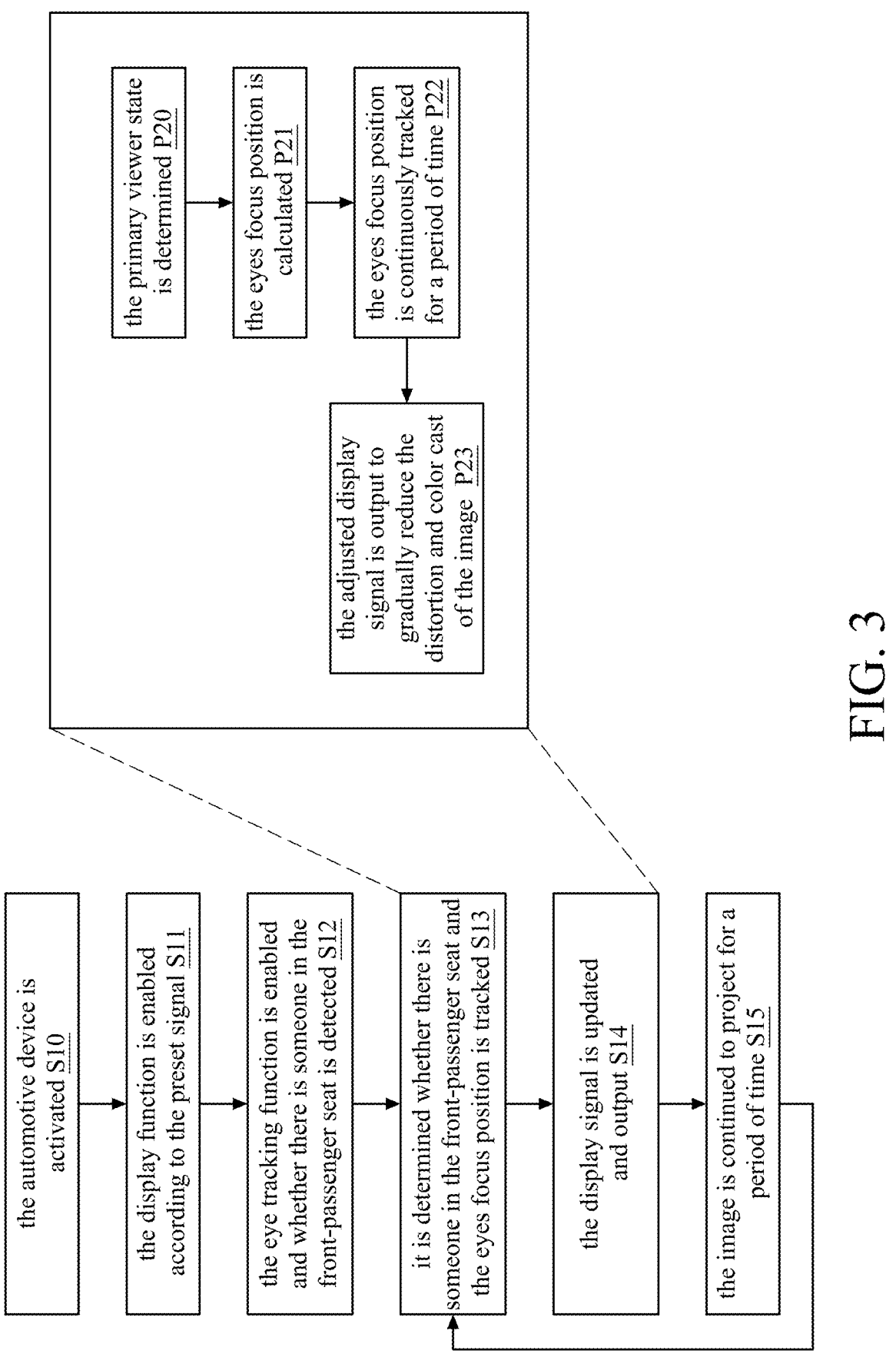
FIG. 3 is a flowchart showing the method for the automotive device to project an image onto the windshield for viewing by the primary viewer according to other embodiments of the present disclosure.
Figure 4:
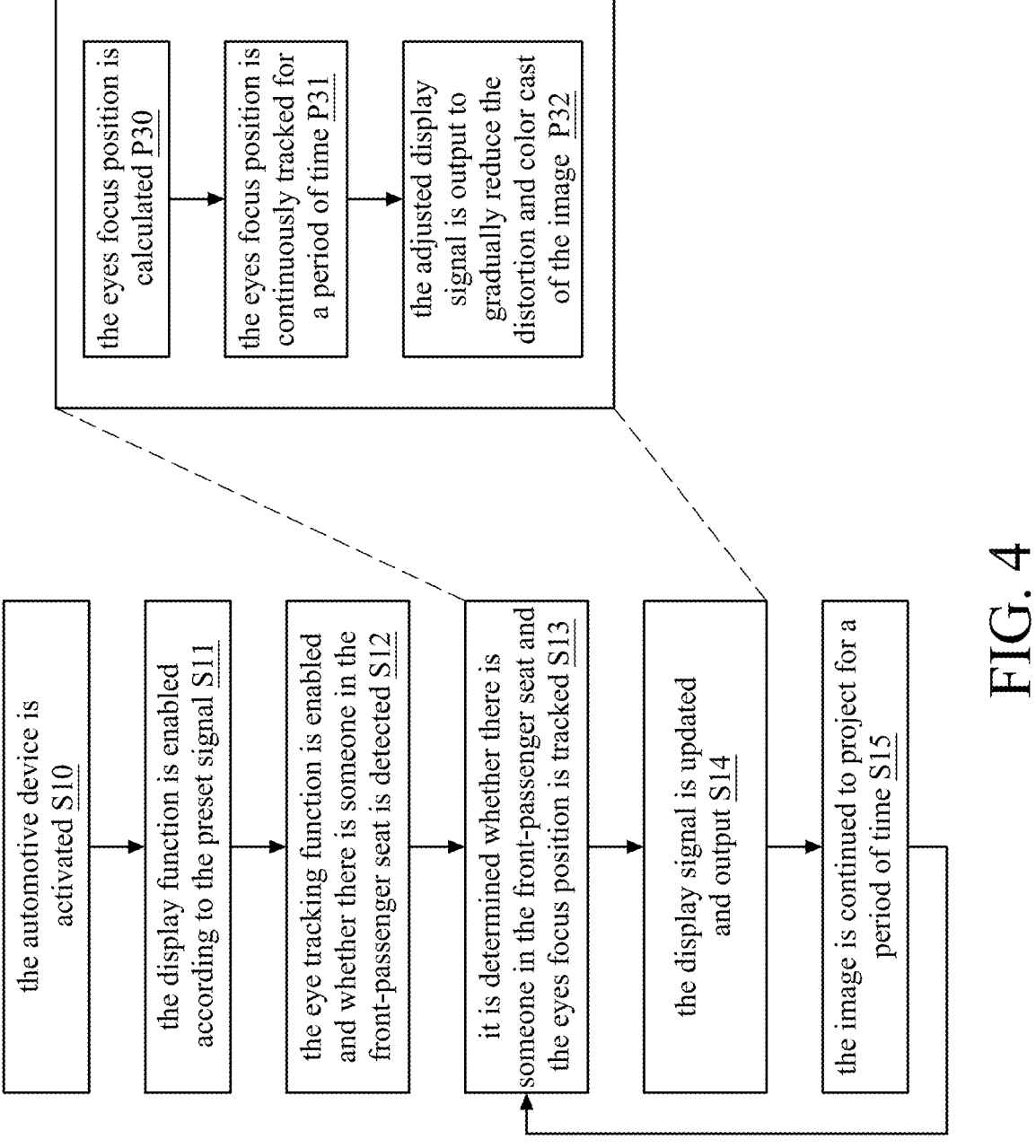
FIG. 4 is a flowchart showing the method for the automotive device to project an image onto the windshield for viewing by the primary viewer according to further embodiments of the present disclosure.

FIGS. 2 to 4 are different flowcharts showing the method for the automotive device to project an image onto the windshield for viewing by the primary viewer according to some embodiments of the present disclosure. Specifically, FIGS. 2 to 4 correspond to the operation modes of the automotive device in different situations. Among them, FIG. 2 is an operation mode in that there is someone in the front-passenger seat. FIG. 3 is an operation mode in that there is a person in the front-passenger seat and further adjusting the image according to the user's eye position. FIG. 4 is an operation mode in that there is no one in the front-passenger seat.

As shown in FIG. 2, in step S10, the automotive device is activated. For example, the automotive device may be electrically connected to the vehicle's engine or electric motor. When the vehicle's engine or electric motor starts, the automotive device is also activated. In step S11, the display function is enabled according to the preset signal. In some embodiments, the default signal refers to a control signal that has not yet been adjusted for the current primary viewer state. For example, the preset signal may include a preset corresponding content correction signal and the corresponding gamma correction signal or include a corresponding content correction signal and the corresponding gamma correction signal corresponding to the last primary viewer state. That is, the control signals of these preset signals have not yet been adjusted for the current driver or the current front-seat passenger. In some embodiments, these preset signals may be stored in the memory unit 111C of the analysis and processing unit 111 of the processing component 11, but the present disclosure is not limited thereto.

In step S12, the eye tracking function is enabled and whether there is someone in the front-passenger seat is detected. For example, the photography component 10 may capture an in-car image. Then the image processing unit 110 of the processing component 11 may generate an in-car image signal according to the in-car image. Finally, the analysis and processing unit 111 may determine whether there is someone in the front-passenger seat according to the in-car image signal. Alternatively, the front-seat passenger sensing information may also be obtained through a front-seat passenger sensing device such as a seat pressure sensor or a seat belt buckle sensor. Then the analysis and processing unit 111 of the processing component 11 may generate a front-seat passenger sensing signal according to the front-seat passenger sensing signal information. Finally, the analysis and processing unit 111 may determine whether there is someone in the front-passenger seat according to the front-seat passenger sensing signal information. Among them, the front-seat passenger sensing information may include seat pressure sensing information, seat belt buckle sensing information, or a combination thereof.

In step S13, it is determined whether there is someone in the front-passenger seat and the eyes focus position is tracked. In step S14, the display signal is updated and output. Among them, the display signal may include a display panel signal and a backlight signal. In some embodiments, when there is someone in the front-passenger seat, steps S13 and S14 may be performed through operations P10 to P12.

In operation P10, the primary viewer state is determined, wherein the primary viewer state is determined to be a driver viewing state or a front-seat passenger viewing state. For example, the above functions may be performed by the photography component 10 and the processing component 11. In operation P11, the eyes focus position is calculated. For example, the above functions may be performed by the processing component 11. In operation P12, the adjusted display signal is output to gradually reduce the distortion and color cast of the image. For example, the processing component 11 may be used to output the corresponding content correction signal and the corresponding gamma correction signal according to the primary viewer state, and then the timing control component 12 may be used to generate the corresponding display signal according to the corresponding content correction signal and the corresponding gamma correction signal, so that the display component 13 displays an image according to the display signal and projects the image onto the windshield.

In step S15, the image is being continuously projected for a period of time, and step 13 is performed again. For example, after the image is projected onto the windshield and continues for a third period, the step of determining the primary viewer state is performed again (i.e., step S13). In some embodiments, the third period is between 0.1 seconds and 0.75 seconds, but the present disclosure is not limited thereto. For example, the third period may be 0.1 second, 0.25 second, 0.30 second, 0.40 second, 0.50 second, 0.60 second, 0.70 second, 0.75 second, or any value or range between the above values. When the third period is less than 0.1 seconds, the primary viewer state may be switched too frequently, thereby affecting the user experience. On the contrary, when the third period is greater than 0.75 seconds, the switching of the primary viewer state may be too slow, and thus the corrected image cannot be provided in time.

In FIG. 3, the contents of steps S10 to S14 may be similar or identical to those in FIG. 2, so the descriptions are omitted. In some embodiments, when there is someone in the front-passenger seat, steps S13 and S14 may be executed by operations P20 to P23.

In operation P20, the primary viewer state is determined, wherein the primary viewer state is determined to be a driving viewing state or a front-seat passenger viewing state. In operation P21, the eyes focus position is calculated. In operation P22, the eyes focus position is continuously tracked for a period of time, so that the driver viewing state includes the driver average eye position, or the front-seat passenger viewing state includes the front-seat passenger average eye position.

Taking the primary viewer state as a driver viewing state as an example, the photographing component 10 may be used to capture a facial image of a driver, then the processing component 11 may analyze the facial image to generate a facial image signal, and finally the processing component 11 may calculate the driver average eye position within the first period according to the facial image signal. As mentioned above, the first period may be between 0.5 seconds and 3 seconds. Similarly, taking the primary viewer state as the front-seat passenger viewing state as an example, the photography component 10 may also be used to capture the facial image of the front-seat passenger, then the processing component 11 may analyze the facial image to generate a facial image signal, and finally the processing component 11 may calculate the front-seat passenger average eye position within the second period according to the facial image signal. As mentioned above, the second period may be between 0.5 seconds and 3 seconds.

In operation P23, the adjusted display signal may be output according to the driver viewing state including the driver average eye position or the front-seat passenger viewing state including the front-seat passenger average eye position, so as to gradually reduce image distortion and color cast. In this way, more accurate distortion correction or color cast correction may be provided.

In FIG. 4, the contents of steps S10 to S14 may be similar or identical to those in FIG. 2, and the descriptions are omitted. In some embodiments, when there is no one in the front-passenger seat, steps S13 and S14 may be performed through operations P30 to P32.

In operation P30, the eyes focus position (that is, the driver eyes) is calculated. In operation P31, the eyes focus position is continuously tracked for a period of time so that the driver viewing state includes the driver average eye position. In operation P23, the adjusted display signal may be output according to the driver viewing state including the driver average eye position, so as to gradually reduce the distortion and color shift of the image. In this way, more accurate distortion correction or color cast correction may be provided.

According to the above, the present disclosure provides a method for an automotive device to project an image onto a windshield for viewing by a primary viewer. It determines the state of the primary viewer through eye tracking and output correction signals for adjusting distortion or color deviation through the processing component. Therefore, an image suitable for the primary viewer's status for viewing is provided.

In addition, the scope of the present disclosure is not limited to the process, machine, manufacturing, material composition, device, method, and step in the specific embodiments described in the specification. A person of ordinary skill in the art will understand current and future processes, machine, manufacturing, material composition, device, method, and step from the content disclosed in some embodiments of the present disclosure, as long as the current or future processes, machine, manufacturing, material composition, device, method, and step performs substantially the same functions or obtain substantially the same results as the present disclosure. Therefore, the scope of the present disclosure includes the abovementioned process, machine, manufacturing, material composition, device, method, and steps. It is not necessary for any embodiment or claim of the present disclosure to achieve all of the objects, advantages, and/or features disclosed herein.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for an automotive device to project an image onto a windshield for viewing by a primary viewer, comprising:

determining a primary viewer state;
    outputting a corresponding content correction signal and a corresponding gamma correction signal according to the primary viewer state;
    generating a corresponding display signal according to the corresponding content correction signal and the corresponding gamma correction signal;
    displaying the image according to the display signal; and
    projecting the image onto the windshield,
    wherein the primary viewer state is determined to be a driver viewing state or a front-seat passenger viewing state, and the front-seat passenger viewing state comprises a front-seat passenger average eye position,
    wherein the step of determining the primary viewer state comprises:
    taking a facial image of a front-seat passenger;
    analyzing the facial image of the front-seat passenger to generate a facial image signal of the front-seat passenger; and
    calculating the front-seat passenger average eye position within a second period according to the facial image signal of the front-seat passenger, wherein the second period is between 0.5 seconds and 3 seconds.

2. The method for the automotive device to project an image onto the windshield for viewing by the primary viewer as claimed in claim 1, wherein the driver viewing state comprises a driver average eye position.

3. The method for the automotive device to project an image onto the windshield for viewing by the primary viewer as claimed in claim 2, wherein the step of determining the primary viewer state comprises:

taking a facial image of a driver;
    analyzing the facial image of the driver to generate a facial image signal of the driver; and
    calculating the driver average eye position within a first period according to the facial image signal of the driver.

4. The method for the automotive device to project an image onto the windshield for viewing by the primary viewer as claimed in claim 3, wherein the first period is between 0.5 seconds and 3 seconds.

5. The method for the automotive device to project an image onto the windshield for viewing by the primary viewer as claimed in claim 4, wherein the first period is 2 seconds.

6. The method for the automotive device to project an image onto the windshield for viewing by the primary viewer as claimed in claim 1, wherein the second period is 2 seconds.

7. The method for the automotive device to project an image onto the windshield for viewing by the primary viewer as claimed in claim 1, wherein the step of determining the primary viewer state comprises:

taking an in-car image;
    analyzing the in-car image to generate an in-car image signal; and
    determining the primary viewer state according to the in-car image signal.

8. The method for the automotive device to project an image onto the windshield for viewing by the primary viewer as claimed in claim 1, wherein the step of determining the primary viewer state comprises:

getting front-seat passenger sensing information,
    analyzing the front-seat passenger sensing information to generate a front-seat passenger sensing signal; and
    determining the primary viewer state according to the front-seat passenger sensing signal.

9. The method for the automotive device to project an image onto the windshield for viewing by the primary viewer as claimed in claim 8, wherein the front-seat passenger sensing information comprises seat pressure sensing information, seat belt buckle sensing information, or both.

10. The method for the automotive device to project an image onto the windshield for viewing by the primary viewer as claimed in claim 1, wherein the display signal comprises a display panel signal and a backlight signal.

11. The method for the automotive device to project an image onto the windshield for viewing by the primary viewer as claimed in claim 1, wherein the display signal comprises a display panel signal.

12. The method for the automotive device to project an image onto the windshield for viewing by the primary viewer as claimed in claim 1, wherein after the image is projected onto the windshield, the step of determining the primary viewer state is performed again following a third period.

13. The method for the automotive device to project an image onto the windshield for viewing by the primary viewer as claimed in claim 12, wherein the third period is between 0.1 seconds and 0.75 seconds.

14. The method for the automotive device to project an image onto the windshield for viewing by the primary viewer as claimed in claim 13, wherein the third period is 0.5 seconds.

15. The method for the automotive device to project an image onto the windshield for viewing by the primary viewer as claimed in claim 1, wherein the corresponding content correction signal and the corresponding gamma correction signal are stored in a memory and are read according to the primary viewer state.

16. The method for the automotive device to project an image onto the windshield for viewing by the primary viewer as claimed in claim 1, wherein the corresponding content correction signal and the corresponding gamma correction signal are generated by interpolation.

* * * * *